(12) United States Patent
Ishii

(10) Patent No.: US 7,102,815 B2
(45) Date of Patent: Sep. 5, 2006

(54) OPTICAL MICROSCOPE SYSTEM AND OPTICAL AXIS CORRECTING METHOD

(75) Inventor: Yasuko Ishii, Tokyo (JP)

(73) Assignee: Olympus Corporation, Tokyo (JP)

(*) Notice: Subject to any disclaimer, the term of this patent is extended or adjusted under 35 U.S.C. 154(b) by 35 days.

(21) Appl. No.: 10/870,850

(22) Filed: Jun. 16, 2004

(65) Prior Publication Data

US 2004/0263956 A1 Dec. 30, 2004

(30) Foreign Application Priority Data

Jun. 27, 2003 (JP) ............................. 2003-184110

(51) Int. Cl.
*G02B 21/00* (2006.01)
(52) U.S. Cl. ...................................... 359/363; 359/381
(58) Field of Classification Search ................ 359/363, 359/368, 381; 348/79, 357; 250/201.3
See application file for complete search history.

(56) References Cited

U.S. PATENT DOCUMENTS 4,655,548 A * 4/1987 Jue ............................ 348/373
5,101,277 A * 3/1992 Kanata ....................... 348/349
5,969,760 A * 10/1999 Ernest et al. ............... 348/357
6,407,768 B1 6/2002 Ishikawa
2003/0011883 A1 1/2003 Ogihara

FOREIGN PATENT DOCUMENTS

| EP | 1 279 985 A2 | 1/2003 |
| JP | 6-75172 A | 3/1994 |
| JP | 6-313850 A | 11/1994 |
| JP | 11-295611 | 10/1999 |
| WO | WO 01/73374 A1 | 10/2001 |

* cited by examiner

*Primary Examiner*—Mark A. Robinson
(74) *Attorney, Agent, or Firm*—Frishauf, Holtz, Goodman & Chick, P.C.

(57) ABSTRACT

An optical microscope system includes: a removable optical element; a capture unit for obtaining an image; a detection unit for detecting first location information indicating the location of a predetermined point in the image captured through the optical element and second location information indicating the location of a point corresponding to the predetermined point in the image captured without the optical element; a calculation unit for calculating the relative amount of displacement between the first location information and the second location information detected by the detection unit; and a movement control unit for moving the capture unit based on the amount of the displacement calculated by the calculation unit.

42 Claims, 18 Drawing Sheets

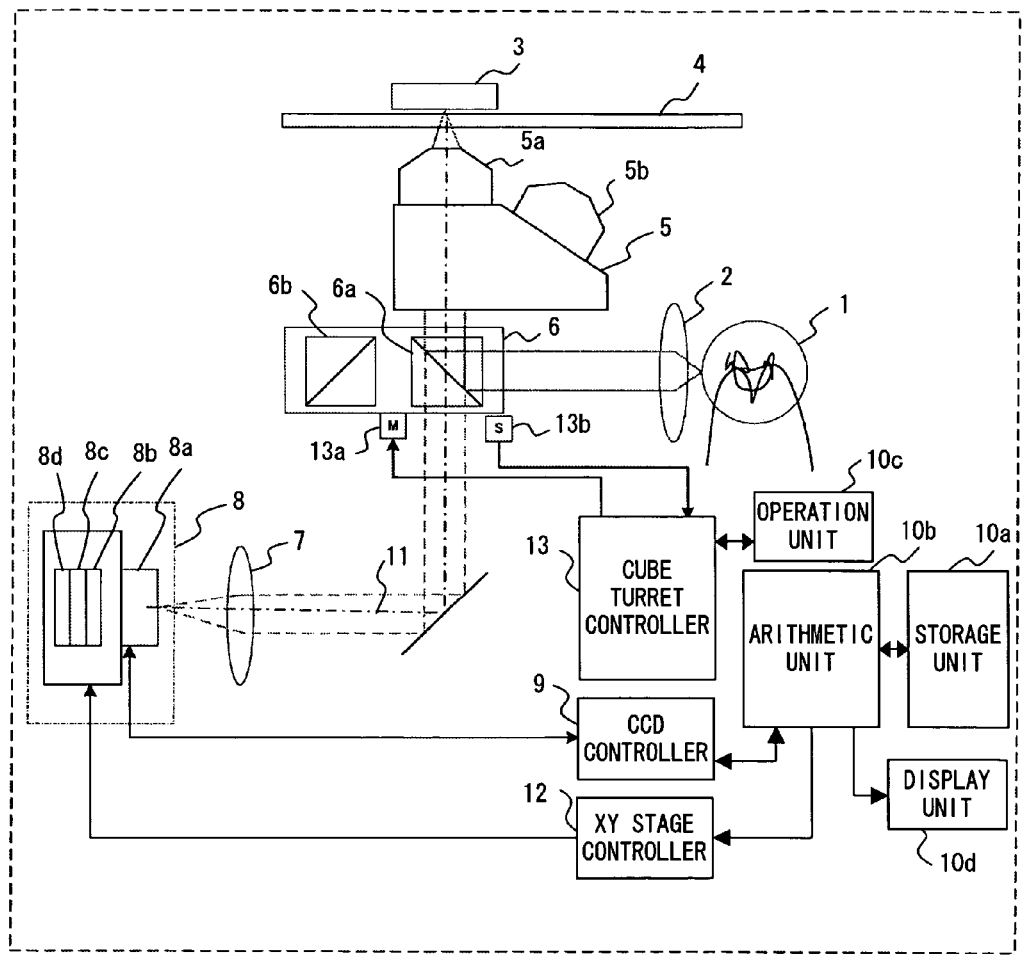
F I G. 1

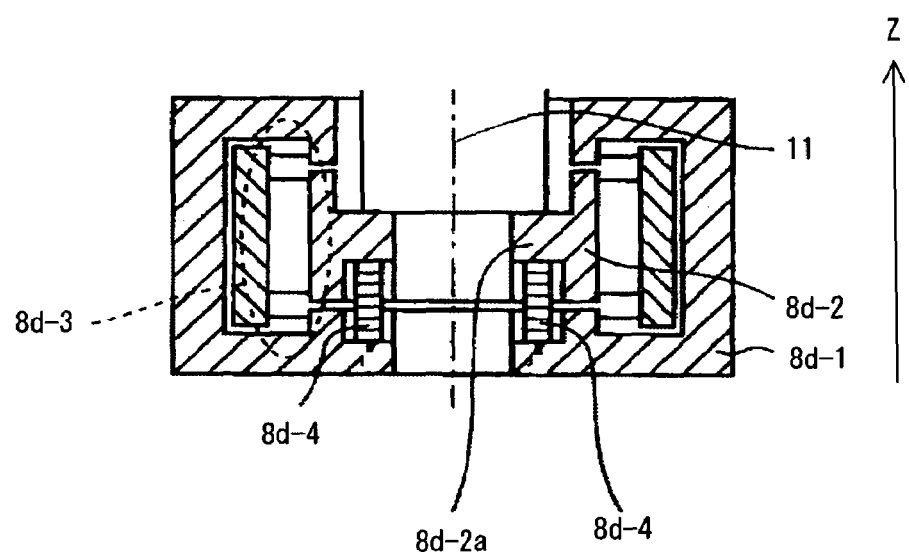
F I G. 5

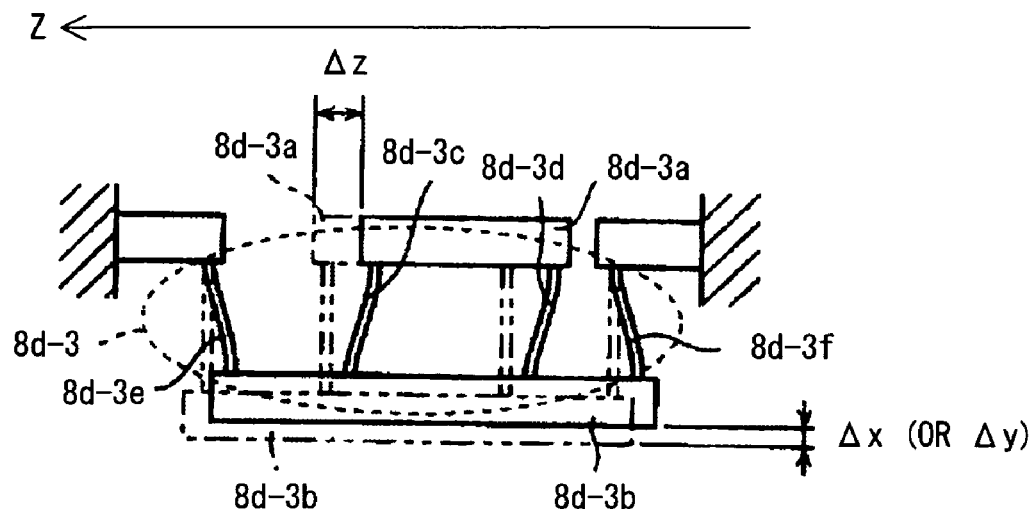
F I G. 6 A
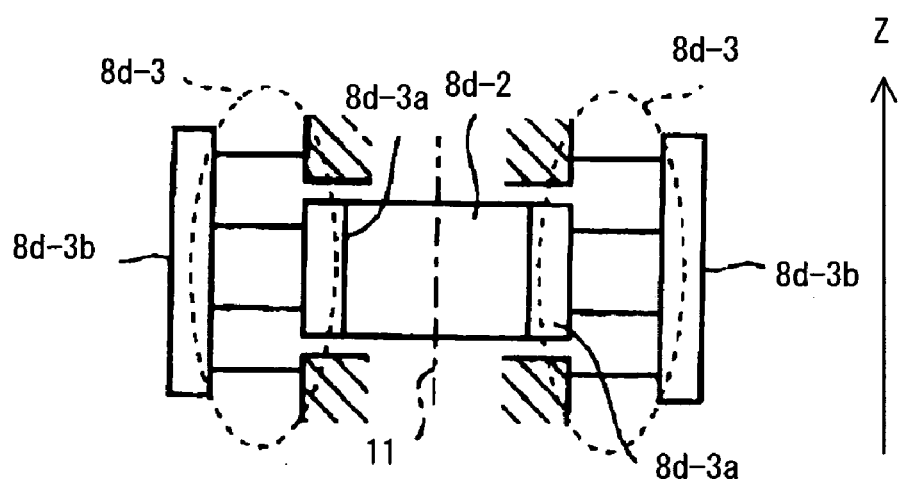
F I G. 6 B

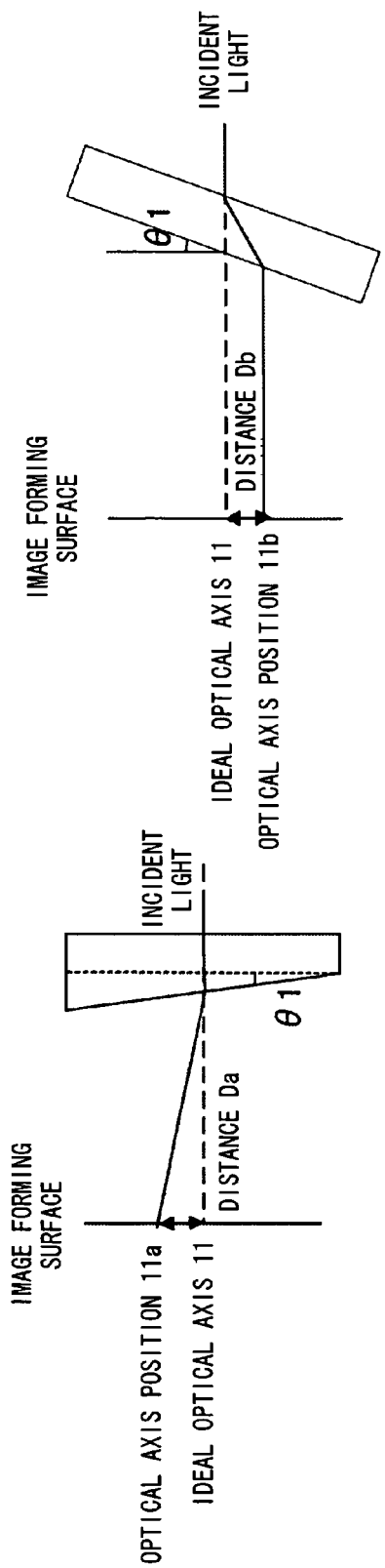

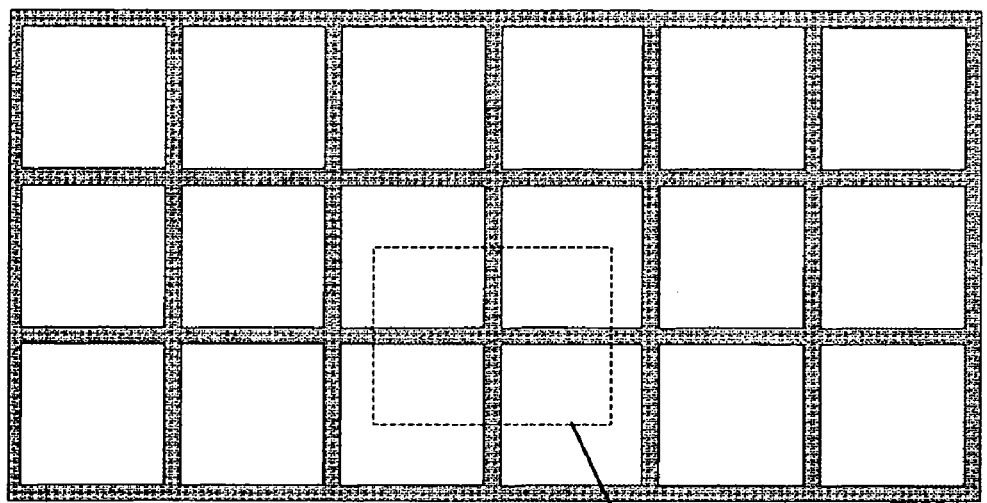
ENLARGEMENT RANGE 14
F I G. 9

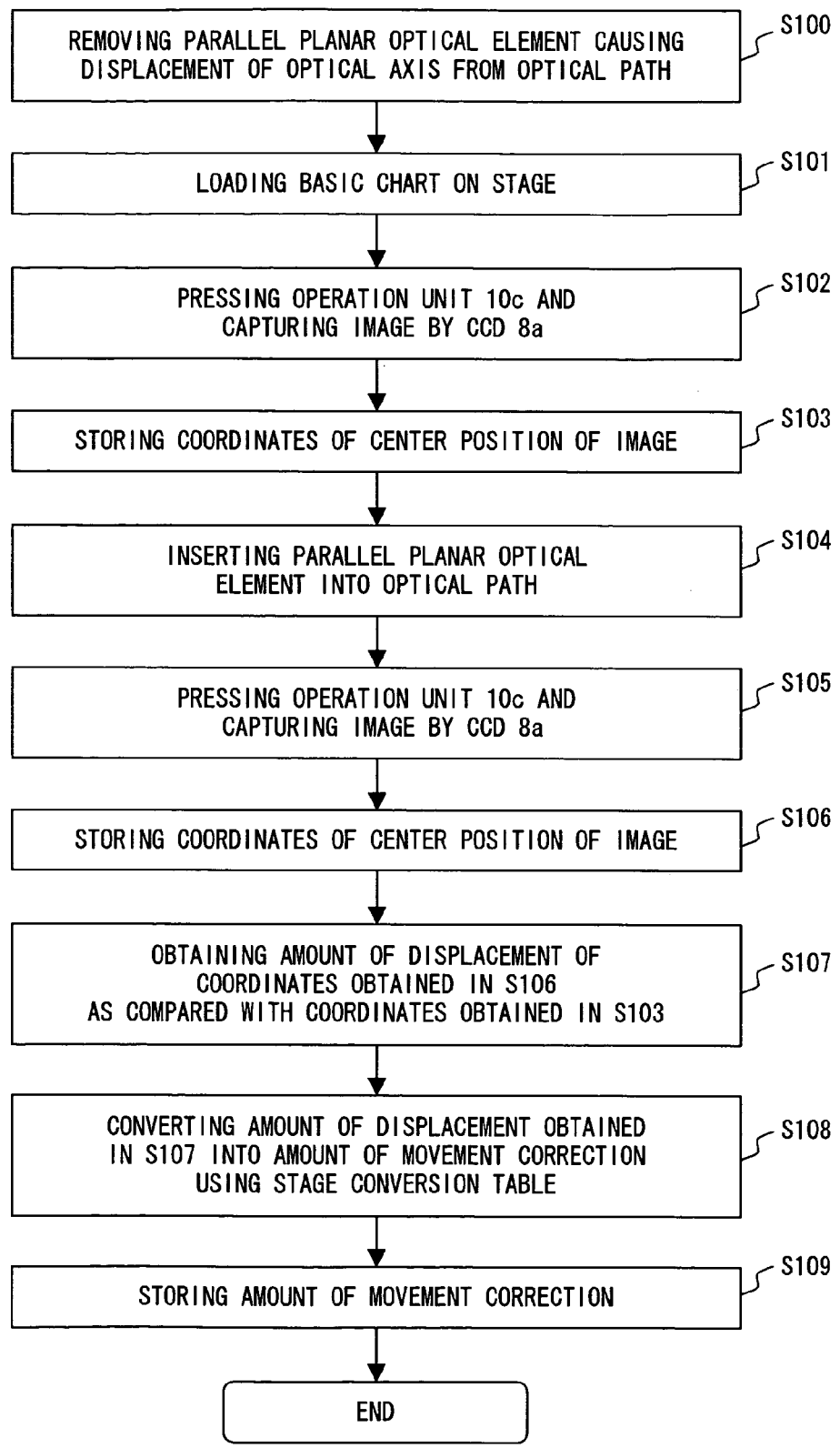
F I G. 1 1

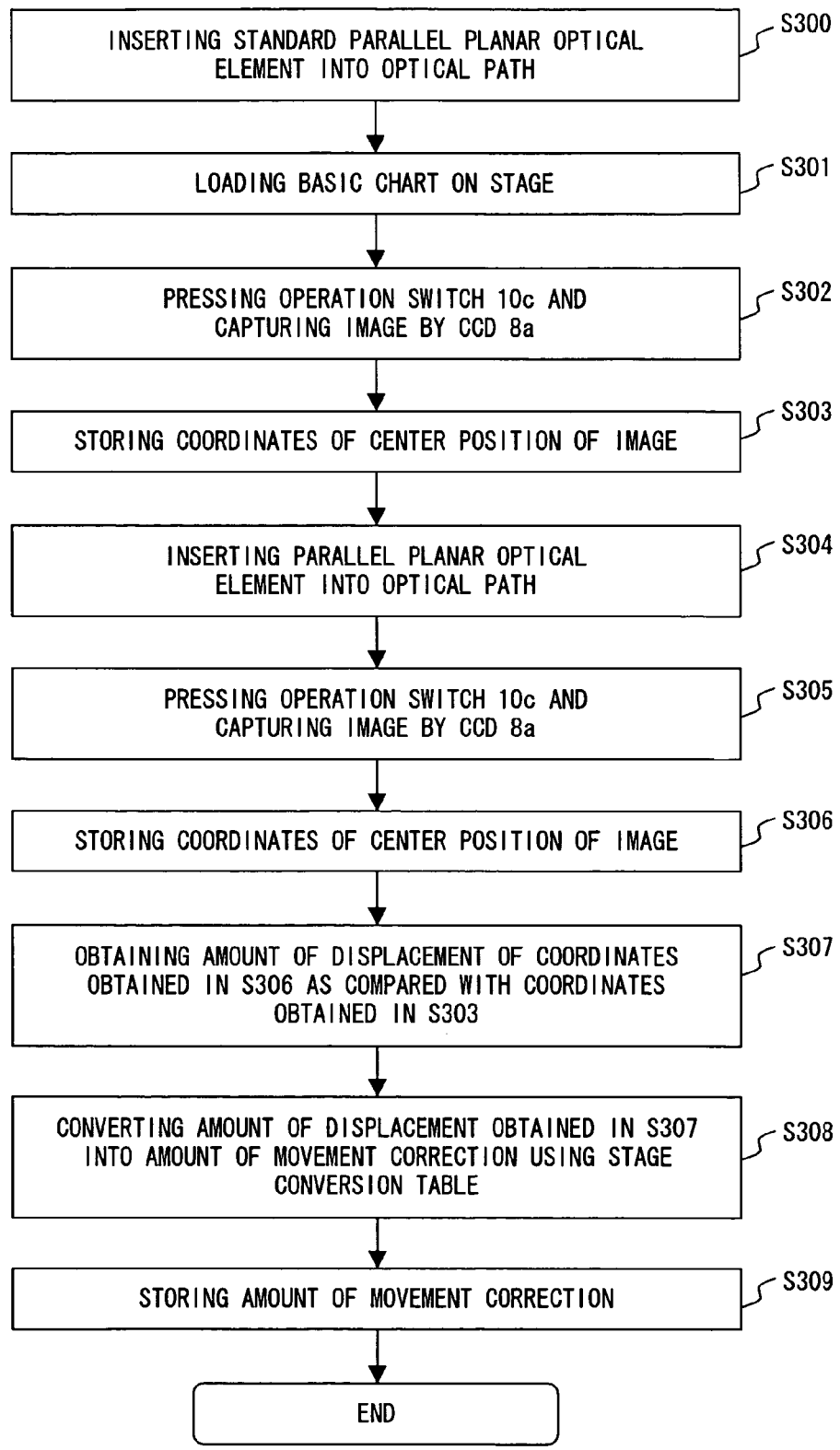
F I G. 1 3

OPTICAL MICROSCOPE SYSTEM AND OPTICAL AXIS CORRECTING METHOD

CROSS REFERENCE TO RELATED APPLICATION

This application is based on and claims the benefit of priority from the prior Japanese Patent Application No. 2003-184110 filed in Japan on Jun. 27, 2003, the entire contents of which are incorporated by this reference.

BACKGROUND OF THE INVENTION

1. Field of the Invention

The present invention relates to a microscope system which has an optical element switch unit and capability of capturing an observation image.

2. Description of the Related Art

An optical element switch unit provided for a microscope has a mechanical engagement system between the movable portion and the fixed portion of the unit so that the optical element can be set in accordance with the optical axis. In the engagement system, each time the central axis on the location of the optical element provided for the unit reaches the position of the observation optical axis of the optical device of the microscope, the turret movable portion and the fixed portion are mechanically engaged, thereby holding the positioning.

However, there can be a displacement of an optical axis generated from the mechanical positioning of an optical element switch unit relative to a microscopic vision image. In addition, although the mechanical positioning of the optical element switch unit is correct, there can be a displacement of an optical axis by the expansion and the contraction under the conditions of the environment such as the humidity, the temperature, etc.

Furthermore, in the optical elements, it is hard to correctly form a parallel plane with a parallel planar optical element. With an object lens, it is hard to set the central point of the lenses forming the object lens. Therefore, there can be a displacement of an optical axis depending on the processing precision.

According to Japanese Patent Application Laid-open No. Hei 6-313850, the amount of displacement of a microscopic vision image by the switch of an object lens and an optical element of the microscope is stored in advance, and the stage of a sample is moved by the amount of displacement, thereby removing the displacement of the microscopic vision image. In Japanese Patent Application Laid-open No. Hei 6-75172, a capture unit captures a microscopic vision image for each of a plurality of different object lenses, and the amount of displacement of a captured image of each object lens is measured and stored using the value of a pixel pitch. Then, using the value of pixel pitch stored when observation is made, the stage of the microscope is traveled and the displacement of a microscopic vision image is removed.

In Japanese Patent Application Laid-open No. Hei 6-313850 and Japanese Patent Application Laid-open No. Hei 6-75172, the problem of the displacement of a microscopic vision image by the switch of an optical element is solved by the movement of the stage by the amount of displacement.

However, when an object to be observed in a liquid is observed, the liquid waves when the stage on which the object to be observed is placed moves. Therefore, there is a high possibility that the object to be observed can move, and the observation is difficult. When the amount of displacement is very small, there is a possibility that the amount of displacement is not correct.

SUMMARY OF THE INVENTION

The present invention aims at correcting the displacement of an optical axis with an object to be observed set still on the stage, and correcting the displacement of an optical axis when an image is enlarged although the displacement of an optical axis is very small.

The optical microscope system according to the present invention includes:
a removable optical element;
a capture unit for obtaining an image;
a detection unit for detecting first location information indicating the location of a predetermined point in the image captured through the optical element and second location information indicating the location of a point corresponding to the predetermined point in the image captured without the optical element;
a calculation unit for calculating the relative amount of displacement between the first location information and the second location information detected by the detection unit; and
a movement control unit for moving the capture unit based on the amount of the displacement calculated by the calculation unit.

The optical microscope system according to the present invention includes:
a plurality of optical elements;
a capture unit for obtaining an image;
a switch unit for switching the first optical element on the optical path in the plurality of optical elements into the second optical element;
a detection unit for detecting the first location information indicating the location of a predetermined point in the image captured through the first optical element and the second location information indicating the location of a point corresponding to the predetermined point in the image captured through the second optical element;
a calculation unit for calculating the relative amount of displacement between the first location information and the second location information detected by the detection unit; and
a movement control unit for moving the capture unit based on the amount of the displacement calculated by the calculation unit.

BRIEF DESCRIPTION OF THE DRAWINGS

FIG. 1 shows an inverted image microscope system according to the first embodiment of the present invention;

FIG. 5 shows the Z stage according to the first embodiment of the present invention;

FIGS. 6A and 6B show the operation of the Z stage according to the first embodiment of the present invention;

FIGS. 7A and 7B show the pattern of the displacement of the position of the optical axis of a parallel planar optical element according to the first embodiment of the present invention;

FIG. 9 shows the basic chart according to the first embodiment of the present invention;

FIG. 11 is a flowchart showing an example of the process of obtaining the amount of movement correction according to the first embodiment of the present invention;

FIG. 13 is a flowchart showing an example of the process of obtaining the amount of movement correction according to the third embodiment of the present invention;

DESCRIPTION OF THE PREFERRED EMBODIMENTS

First Embodiment

Figure 2:
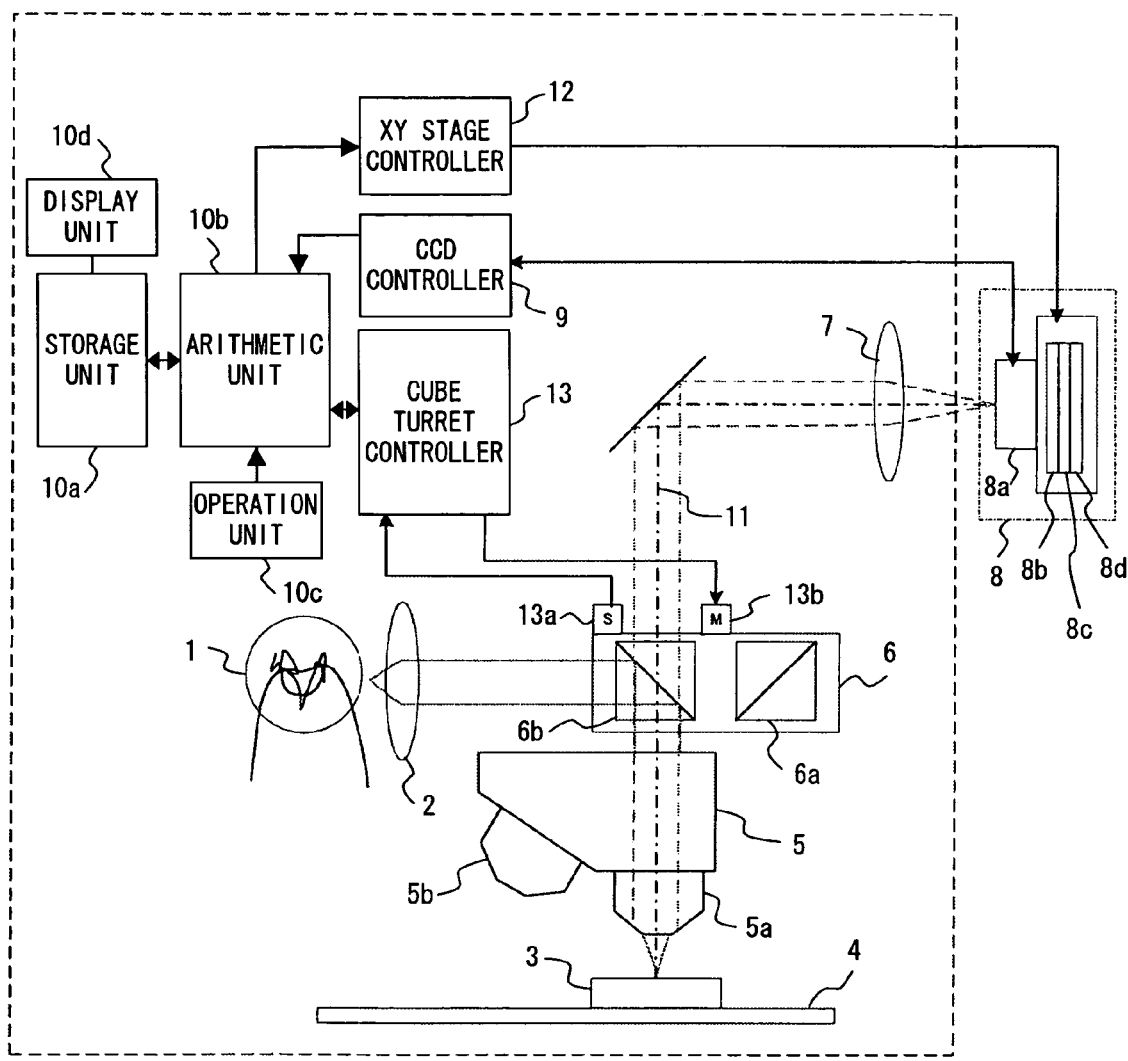
FIG. 2 shows an erect image microscope system according to the first embodiment of the present invention.

The present invention is described below in detail by referring to FIGS. 1 through 5, 6A, and 6B. FIGS. 1 and 2 show the basic configurations of an inverted image microscope and an erect image microscope. In FIGS. 1 and 2, the light emitted from a source 1 enters an illuminating lens system 2, and Kohler-illuminating a sample 3 on a stage 4 through a parallel planar optical element 6a in an optical element unit 6 and an object lens 5a in an object lens unit 5. The reflected light enters the object lens 5a of the object lens unit 5, then enters an infinity correction optical system, and passes through the parallel planar optical element 6a of the optical element unit 6. An image forming lens 7 allows the light to form an image on a capture unit 8, and a CCD 8a captures a microscopic vision image. The optical element unit 6 is implemented with a parallel planar optical element such as a plurality of band pass filters, a plurality of ND filters, a dichroic mirror, etc.

The capture unit 8 is formed by the CCD 8a for capturing an image, an XY stage 8b, a Z stage 8c, and a θ stage 8d for moving the CCD 8a. According to the contents from an operation unit 10c, the capturing operation of the CCD 8a is controlled by a CCD controller 9 through an arithmetic unit 10b. The captured image is stored in a storage unit 10a from the arithmetic unit 10b through the CCD controller 9. The XY stage 8b, the Z stage 8c, and the θ stage 8d are controlled by a stage controller 12 based on the value indicated by the arithmetic unit 10b.

When the parallel planar optical element of the optical element unit 6 is switched, a switch instruction is issued from the operation unit 10c to a cube turret controller 13. Based on the control designated by the cube turret controller 13, a motor 13a is driven, thereby operating the optical element unit 6. A sensor 13b detects that a target parallel planar optical element 6a (or 6b, and the parallel planar optical elements 6a, 6b, . . . are hereinafter referred to generally as a parallel planar optical element 6x) has been inserted into an optical path, and the operation stops. The sensor 13b is formed by, for example, a photo interrupter. The object lens 5a can be manually operated, and an object lens 5b can be used (the object lenses 5a, 5b, . . . are hereinafter referred to generally as a object lens 5x).

The above-mentioned capture unit 8 can be a unit incorporated into a microscope system, or an external unit to the microscope system. When the capture unit 8 is an external unit, it can be replaced with an eyepiece or a digital camera. The optical element unit 6 and the object lens unit 5 can be of any structure so far as an optical element in the optical path can be switched. However, a revolver sliding type structure is commonly used.

The configurations and the operations of the θ stage 8b, the XY stage 8c, and the Z stage 8d in the capture unit 8 are briefly described below by referring to FIGS. 3, 4, 5, 6A, and 6B.

Figure 3:
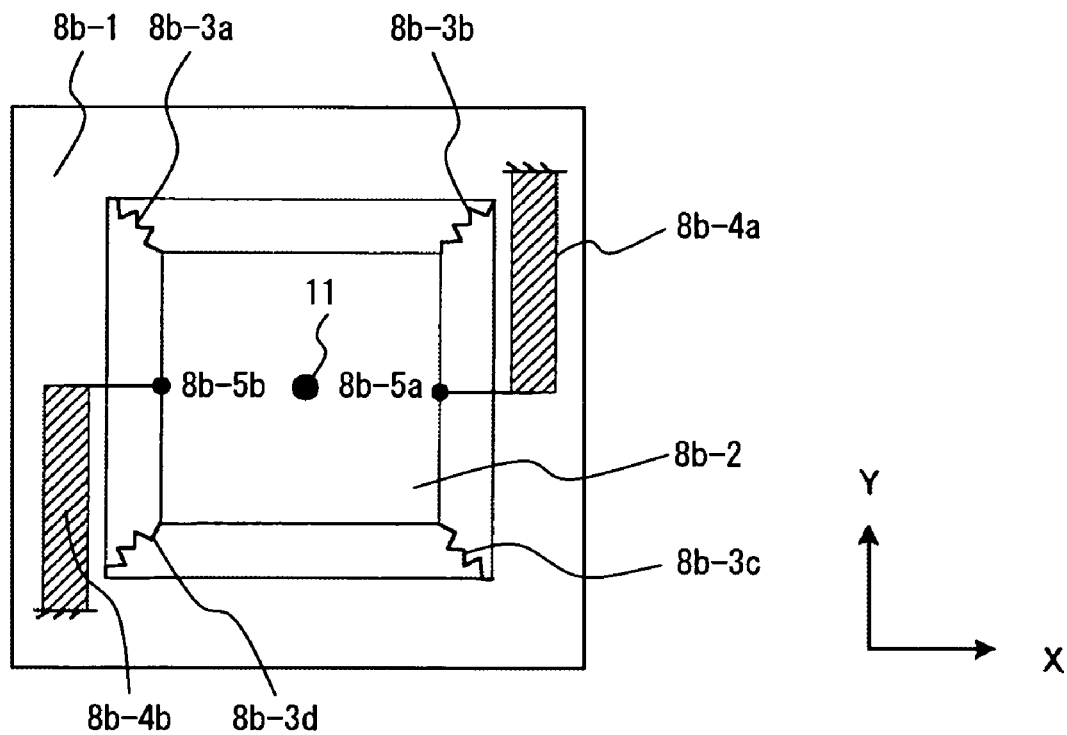
FIG. 3 shows the θ stage according to the first embodiment of the present invention.

FIG. 3 is an elevation of the θ stage 8b. The configuration and the movement mechanism of the θ stage 8b are described below by referring to FIG. 3. A movable portion 8b-2 is connected through a fixed table 8b-1, springs 8b-3a, 8b-3b, 8b-3c, and 8b-3d, and piezoelectric substances 8b-4a and 8b-4b. Each end portion of the piezoelectric substances 8b-4a and 8b-4b is fixed to the fixed table 8b-1. The other end portions of the piezoelectric substances 8b-4a and 8b-4b are respectively connected to the movable portion 8b-2 such that the movable portion 8b-2 can be placed parallel to the fixed table 8b-1 in the XY direction as shown in FIG. 3 when the voltage of the half value of the applied voltage with which the piezoelectric substances 8b-4a and 8b-4b are the most expanded is applied.

Then, the operation of the θ stage 8b is described below. First, to rotate the movable portion 8b-2 counterclockwise, 8b-5a is pulled upwards and the 8b-5b is pulled downwards by dropping the voltage applied to the piezoelectric substances 8b-4a and 8b-4b, thereby rotating the movable portion 8b-2 with the optical axis 11 set on center. To rotate the movable portion 8b-2 clockwise, 8b-5a is pulled downwards and 8b-5b is pulled upwards by applying a voltage to the piezoelectric substances 8b-4a and 8b-4b, thereby rotating the movable portion 8b-2 with the optical axis 11 set on center.

Figure 4:
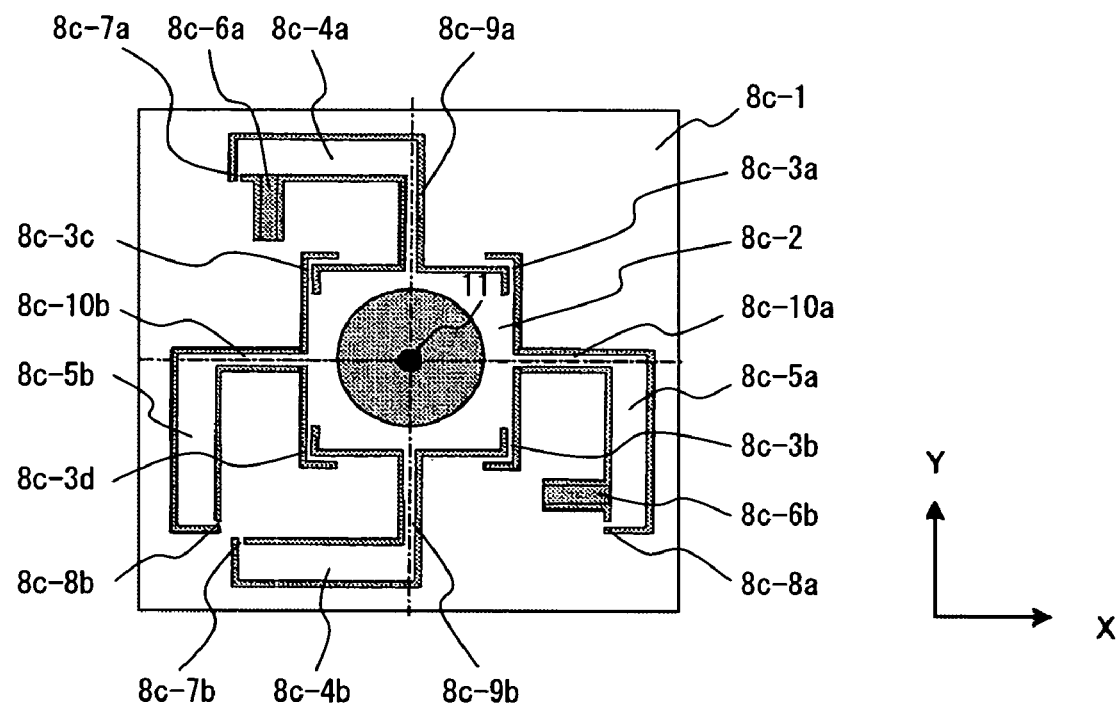
FIG. 4 shows the XY stage according to the first embodiment of the present invention.

The configuration and the movement mechanism are explained below by referring to the elevation of the XY stage 8c shown in FIG. 4. The shaded portion of a plate having the thickness of about 5 mm is cut off by a wire discharge processor, etc. To attain this, the stage is made thin. One end of each of arms 8C-4a, 8c-4b, 8c-5a, and 8c-5c is connected to a fixed table 8c-1 respectively by hinges 8c-7a, 8c-7b, 8c-8a, and 8c-8b. Thus, a movable portion 8c-2 connected to the arms 8C-4a, 8c-4b, 8c-5a, and 8c-5c can be movable on the XY plane.

The other ends of the arms 8c-4a, 8c-4b, 8c-5a, and 8c-5b are connected to the movable portion 8c-2 respectively by drive springs 8c-9a, 8c-9b, 8c-10a, and 8c-10b. Piezoelectric actuators 8c-6a and 6c-6b are arranged as pressing a part of the arms 8c-4a and 8c-5a.

The operations are explained below. First, the operation performed when the movable portion 8c-2 is moved in the Y direction is explained. A voltage is applied to the piezoelectric substance 8c-6a. When it is expanded, the arm 8c-4a rotates on the XY plane with the hinge 8c-7a set as an axis.

With the movement, the drive spring 8c-9a moves in the Y direction, and the movable portion 8c-2 connected to the drive spring 8c-9a also moves in the Y direction.

At this time, the drive springs 8c-10a and 8c-10b connected in the X direction of the movable portion 8c-2 are bent and deformed. However, since the movable portion 8c-2 is arranged symmetrically about the Y axis, it possibly moves in the Y direction without a rotating operation. The identical operations are performed when the movable portion 8c-2 moves in the X direction.

The configuration and the movement mechanism are explained below by referring to the elevation of the Z stage 8d shown in FIG. 5. The Z stage 8d comprises a fixed table 8d-1, a tremor table 8d-2, a parallel spring 8d-3 as a guide unit, and a piezoelectric substance 8d-4. In this example, the fixed table 8d-1 is cylindrical. The tremor table 8d-2 is arranged in the hollow portion of the fixed table 8d-1. The tremor table 8d-2 is cylindrical, and has a support unit 8d-2a extruding at the intermediate position in the hollow portion in the central axis direction. The support unit 8d-2a supports the table along the central axis of the fixed table 8d-1.

The piezoelectric substance 8d-4 is arranged in the position symmetrical about an optical axis 11 between the support unit 8d-2a of the tremor table 8d-2 and the fixed table 8d-1. The piezoelectric substance 8d-4 expands and reduces according to an electrical signal. The expanding and reducing operation trembles the tremor table 8d-2 along the optical axis 11.

The parallel springs 8d-3 are arranged in the position symmetrical about the optical axis 11. The parallel springs 8d-3 support the tremor table 8d-2 on the fixed table 8d-1, and smooth the parallel movement along the optical axis 11.

The actual operation of the Z stage 8d is explained by referring to FIGS. 6A and 6B. In this case, the parallel springs 8d-3 are moved by being coupled by the two parallel leaf springs 8d-3c, 8d-3d, 8d-3e, and 8d-3f between a pair of parallel mobile objects 8d-3a and 8d-3b as shown in FIG. 6A. Thus, the parallel springs 8d-3 maintain the constant height of the mobile object 8d-3a. That is, when the mobile object 8d-3a moves by ΔZ, the operation of the two leaf springs move the mobile object 8d-3b by ΔX (or ΔY) toward the mobile object 8d-3a, and the mobile object 8d-3a cancels the displacement to the X axis (or Y axis).

Thus, when the parallel springs 8d-3 are arranged in the position symmetrical about the optical axis 11 as shown in FIG. 6B, the tremor of the tremor table 8d-2 does not generate the pulling force in the direction orthogonal to the optical axis 11, thereby smoothly moving the tremor table 8d-2 parallel to the optical axis 11 (Z axis direction).

Thus, by each of the above-mentioned movement mechanisms, the XY stage 8c can be placed on a tremor table 8d-6 of the Z stage 8d, the θ stage 8b can be placed on the movable portion 8c-2 of the XY stage 8c, the CCD 8a can be placed on the movable portion 8b-2 of the θ stage 8b, and a voltage of a necessary amount is applied to each stage, thereby moving the CCD 8a in the XYZθ direction for a capturing operation. The Z stage 8d, the XY stage 8c, and the θ stage 8b can be placed in any other orders.

The actual correcting operation is described below. In the microscope system shown in FIG. 1, an optical element which generates a displacement of an optical axis can be, for example, an object lens 5a and a parallel planar optical element 6a. The cause of the displacement of an optical axis is explained below using the parallel planar optical element 6a most likely to generate a displacement of an optical axis as an example by referring to FIGS. 7A, 7B, 8A, and 8B.

The parallel planar optical element which passes incident light is explained below by referring to FIGS. 7A and 7B. When the plane of the parallel planar optical element is inclined by θ1 as shown in FIG. 7A, an optical axis 11a of reflected light forms an image with the position of a distance Da from the ideal optical axis 11 set on center. Furthermore, as shown in FIG. 7B, when the parallel planar optical element itself is inclined by θ1, an optical axis 11b of reflected light forms an image with the position of a distance of Db from the ideal optical axis 11 set on center.

A parallel planar optical element which includes a reflecting plate and reflects incident light is described below by referring to FIGS. 8A and 8B. When the angle of the reflecting plate in the parallel planar optical element is larger than 45° by θ1 as shown in FIG. 8A, an image is formed with the optical axis 11a of reflected light displaced by the distance Da from the ideal optical axis 11 on the image-forming plane.

Figures 8A, 8B:
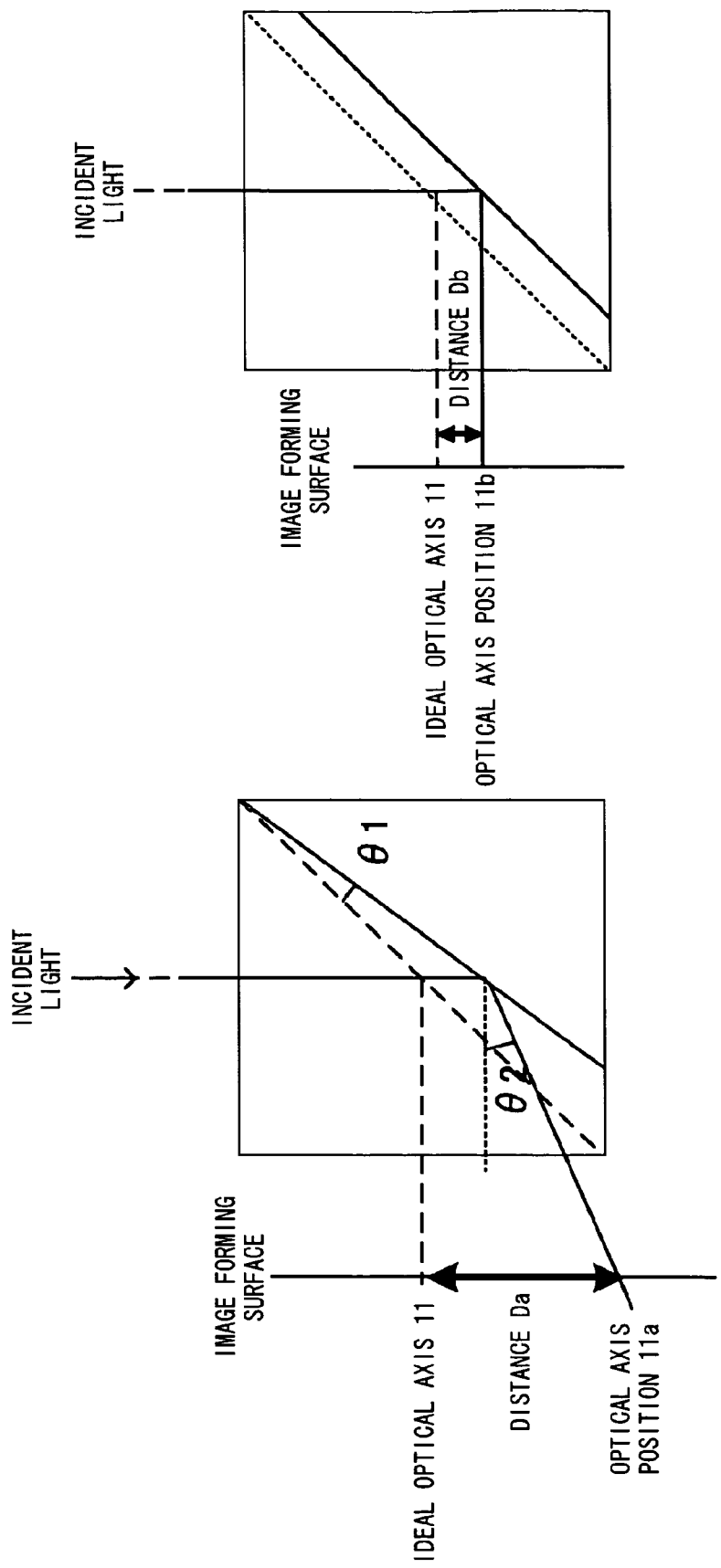
FIGS. 8A and BB show the pattern of the displacement of the position of the optical axis of a parallel planar optical element (reflecting plate) according to the first embodiment of the present invention.

If the position of the reflecting plate is displaced downwards by the distance Db although the inclination of the reflecting plate is 45° as shown in FIG. 8B, the position of the optical axis 11b on the image forming surface is displaced by the distance Db from the ideal optical axis 11 when an image is formed. However, the direction of the displacement of the reflecting plate can be any of the upward direction, the downward direction, left and right as shown in FIG. 8B. The left and right displacements are caused by the parallel planar optical element rotated and attached to the optical axis. The displacement of an optical axis due to the parallel planar optical element can be caused by a combination of the above-mentioned various causes. Therefore, there is a high possibility of a displacement of an optical axis.

As described above, the displacement distance D from the ideal optical axis 11 is calculated as an amount of movement correction using the stage conversion table, etc., and the calculated amount of movement correction is converted into a voltage value for drive (movement) of the θ stage 8b, the XY stage 8c and the Z stage. Then the stages are driven based on the obtained voltage value, thereby correcting the displacement of the optical axis. The method of obtaining the distance D (a amount of displacement) at this time is explained by referring to FIGS. 9, 10A, 10B, and 11.

Figure 10A:
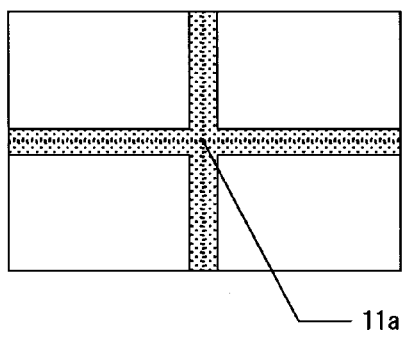
FIGS. 10A and 10B show the microscopic vision image according to the first embodiment of the present invention.

FIG. 9 is a basic chart according to the present embodiment. FIG. 10A shows an enlarged portion, displayed on a display unit 10d, of the basic chart shown in FIG. 9. FIG. 11 is a flowchart showing an example of the process of obtaining the amount of movement correction by obtaining a displacement of an optical axis. In the present embodiment, the distance d is obtained from the crossing position in the enlargement range 14 shown in FIG. 9.

First, to obtain an ideal optical axis, an optical element which possibly causes a displacement of an optical axis such as the parallel planar optical element 6a, etc. is removed from the optical path (S100). Then, a basic chart in which the optical axis 11 matches the crossing position 11a is arranged on the stage 4 (S101). Then, by pressing a predetermined switch of the operation unit 10c (operation switch 10c), the capture designation information is transmitted to the arithmetic unit 10b. Upon receipt of the capture designation information, the arithmetic unit 10b controls the CCD controller 9 to capture an image using the CCD 8a (S102, refer to FIG. 10A)

As shown in FIG. 10A, the coordinates of the crossing position 11a indicating the center position of the image captured by the CCD 8a are obtained and stored in the storage unit 10a (S103). Then, the position of the basic chart is maintained as is, and the parallel planar optical element 6a removed from the optical path in S100 is rearranged on the optical path (S104). Then, by pressing a predetermined switch of the operation unit 10c (operation switch 10c), the capture designation information is transmitted to the arithmetic unit 10b. Upon receipt of the capture designation information, the arithmetic unit 10b controls the CCD controller 9 to capture an image using the CCD 8a (S105, refer to FIG. 10A). In S102 and S105, the trigger of capturing an image is not limited to the above-mentioned operation unit (operation switch). For example, the panel displayed on the display unit 10d can be clicked by the mouse, etc. for a capturing operation. Also, for example, the function of a touch panel can be used on the display unit 10d to capture an image by touching the displayed panel.

As in S103, the coordinates of the crossing position indicating the center position of the image captured by the CCD 8a is obtained, and the coordinates are stored in the storage unit 10a (S106). In the present embodiment, the coordinates of the crossing position are obtained from the image displayed on the display unit 10d, and stored in the storage unit 10a through the arithmetic unit 10b. Generally, the mouse provided for a computer can click on an image, or an image recognizing process realized by automating a similar process is performed to obtain the coordinates. Furthermore, the information that the parallel planar optical element 6a has been inserted into the optical path in S104 can be automatically recognized using a sensor, etc. In this case, the sensor can detect that the parallel planar optical element 6a has been inserted, the detection information is transmitted to the arithmetic unit 10b, and the arithmetic unit 10b internally controls the CCD controller 9 to capture an image by the CCD 8a, thereby allowing the CCD 8a to capture an image.

Assume that the coordinates obtained in S103 and S106 are 11a (Xa, Ya) and 11b (Xb, Yb) respectively. Using the obtained coordinates, the arithmetic unit 10b calculates the amount of displacement of the coordinates 11b (Xb, Yb) from the coordinates 11a (Xa, Ya) (S107). Then, using the stage conversion table stored in advance in the storage unit 10a, the amount of movement correction of the stage 4 is calculated from the amount of displacement (S108). The calculated amount of movement correction is converted into a voltage value for drive (movement) of each stage of the θ stage coordinates system and the XY stage coordinates system, and the voltage value is stored in the storage unit 10a (S109).

When the parallel planar optical element 6a is inserted into the optical path, the CCD 8a is moved by moving the θ stage 8b, the XY stage 8c, and the Z stage 8d based on the voltage value stored in S109 using the stage controller 12, and the optical axis coordinates 11b (Xb, Yb) are captured in the position of 11a (Xa, Ya). In the case of the Z direction, the amount of displacement is obtained by the auto-focusing capability although it is not shown in the attached drawings, and it is converted from the amount of displacement into a voltage value corresponding to the amount of movement correction using the stage conversion table.

When a displacement of an optical axis is corrected for the optical element which generates a displacement of an optical axis such as the object lens 5a, the amount of displacement is obtained in the method similar to the above-mentioned method, and the amount of movement correction which is the distance for movement of the CCD 8a is calculated. The amount of displacement can be obtained with a plurality of optical elements inserted into the optical path. The displacement of an optical axis can also be corrected when a plurality of optical elements are combined and observed by inserting each optical element unit into the optical path and adding up the calculated amounts of movement correction.

In the present embodiment, the amount of displacement of coordinates is obtained by comparing one point in an image, and the amount of displacement is converted into a voltage value for stage drive, thereby correcting the displacement of an optical axis. However, the number of obtained coordinates or the obtained coordinates are not specified so far as the displacement of an optical axis is actually obtained. Additionally, other samples can be used so far as a correct position can be calculated although an environment is changed as in the basic chart.

Second Embodiment

Figure 12A:
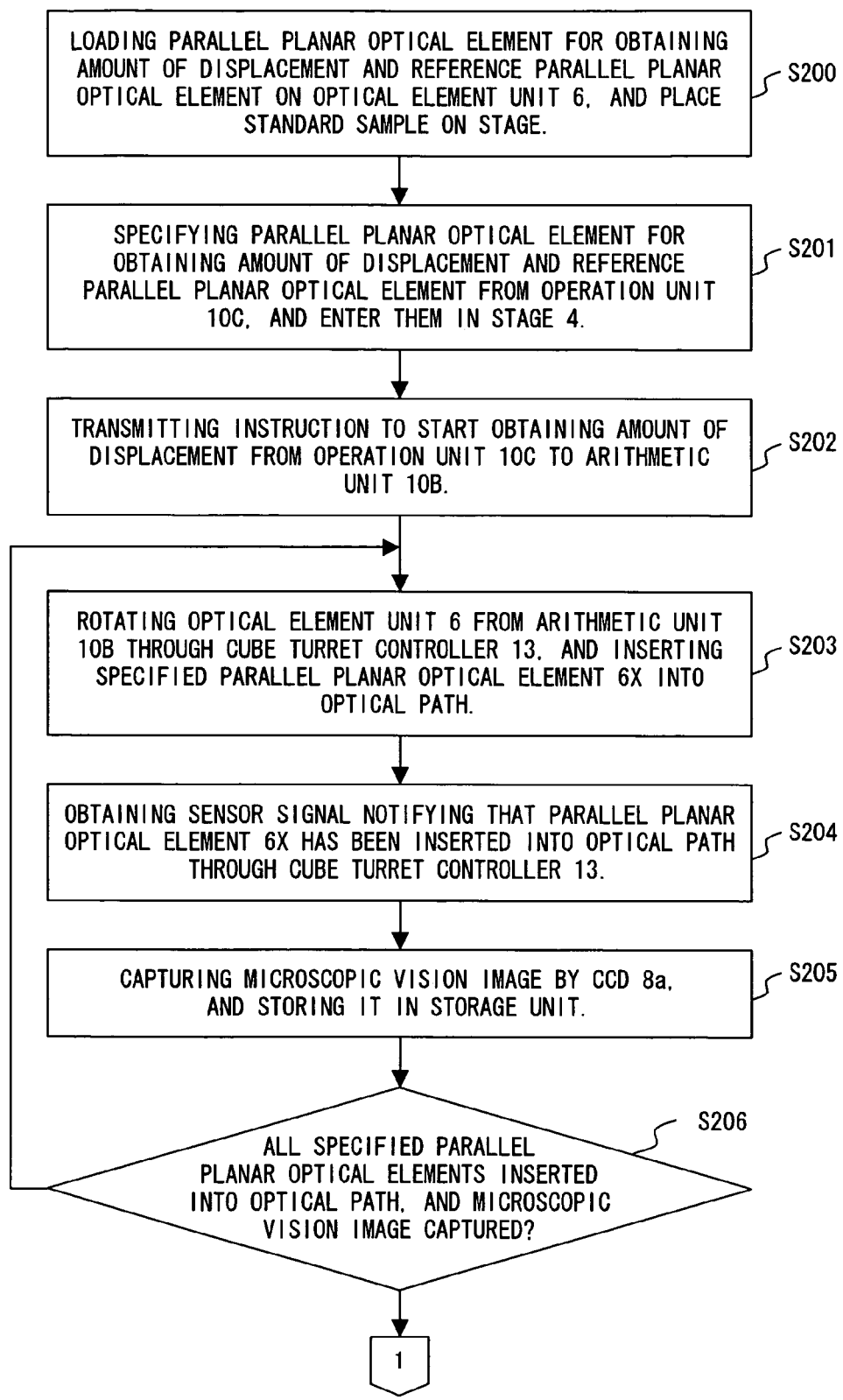
FIGS. 12A and 12B are flowcharts showing examples of the process of obtaining the amount of movement correction according to the second embodiment of the present invention.
Figure 12B:
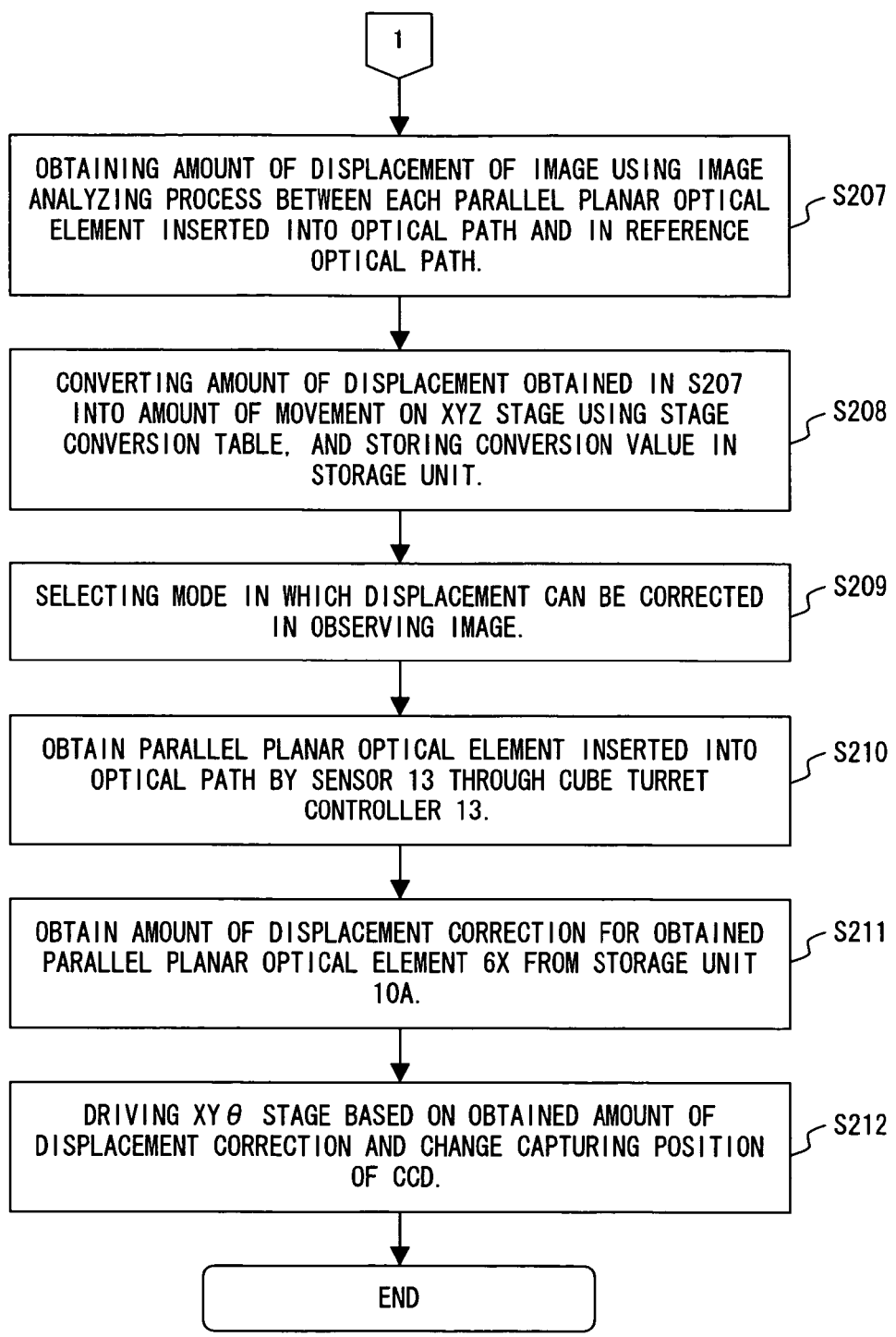

To reduce the load of the observer who observes with microscope attached a plurality of optical elements, the amount of displacement of an image for all optical elements can be automatically obtained for all optical elements and the displacement of an image can be automatically corrected when each optical element is observed by performing the process according to the first embodiment shown in FIG. 11. For example, the process is briefly explained by referring to the flowcharts shown in FIGS. 12A and 12B.

The basic chart is put on the stage 4 with the parallel planar optical element whose amount of displacement is to be corrected applied to the optical element unit (S200). Then, the operation unit 10c specifies the parallel optical element whose amount of displacement is to be obtained, and a standard parallel planar optical element is also specified, and the information specified of the parallel planar optical elements is stored in the storage unit 10a (S201), and the start of the process of obtaining the amount of displacement is specified (S202). Then, the parallel planar optical element specified for obtaining the amount of displacement, registered in the storage unit 10a in S201, is inserted into the optical path (S203). In this example, the arithmetic unit 10b controls the cube turret controller 13 to rotate a cube turret 6, select the parallel planar optical element specified in S201 and stored in the storage unit 10a, and insert the specified parallel planar optical element into the optical path.

When the sensor 13b detects that the parallel planar optical element has been inserted into the optical path, it notifies the arithmetic unit 10b of the detection signal through the cube turret controller 13, and the arithmetic unit 10b recognizes that the parallel planar optical element on the optical path has been switched (S204). To obtain an image with the parallel planar optical element whose amount of displacement is to be obtained set on the optical path, the arithmetic unit 10b controls the CCD controller 9 to capture a microscopic vision image using the CCD 8a. The captured vision image is stored in the storage unit 10a (S205). The processes in S203 through S205 are repeated until a microscopic vision image is captured with all specified parallel planar optical elements inserted into the optical path (S206). As mentioned above, the processes in S203 through S205 are described in the format in which the arithmetic unit 10b is automatically processed. However, the optical element unit can be operated through the cube turret controller 13 by operating the operation unit 10c, or an image can be captured by the CCD 8a through the CCD controller 9 by operating the operation unit 10c.

Then, in the image. analyzing process, the amount of displacement between each microscopic vision image and the standard microscopic vision image is obtained (S207). Then, the distance of the movement of the stage in the capture unit 8 is calculated from the amount of displacement using the stage conversion table stored in the storage unit 10a, and a voltage value for drive of each stage is calculated from the amount of movement correction, and stored in the storage unit 10a (S208).

The operation unit 10c selects a mode in which a displacement of an image can be automatically corrected when an observation is made (S209). When a parallel planar optical element on the optical path is switched, the switched parallel planar optical element is detected by the cube turret controller 13, and the arithmetic unit 10b obtains the detection information through the cube turret controller 13 (S210). The arithmetic unit 10b obtains the amount of displacement correction corresponding to the detected parallel planar optical element from the storage unit 10a (S211) Based on the obtained amount of displacement correction, the XY stage 8c, the θ stage 8b, and the Z stage 8d, thereby moving the CCD 8a by the amount of movement correction (S212), and capturing a microscopic vision image having a matching optical axis position. However, when an observation is made using the same optical element, it is not necessary to perform the processes in S200 through S208 so far as the optical element is not removed from the microscope system after once performing the processes from S208 to S208.

The above-mentioned invention can be applied to all optical elements such as an object lens, etc. which generates a displacement of an optical axis in an optical element switch unit in the microscope system, furthermore, the amount of displacement can be obtained with a plurality of optical elements inserted into the optical path. Additionally, the amount of movement correction can be manually obtained. With the configuration in the capture unit realized by a combination of the stages (XY stage 8c, θ stage 8b, and Z stage 8d) loaded with the CCD 8a, the amount of displacement can be corrected in any direction of the microscopic vision image.

Third Embodiment

To correct the displacement of an optical axis in the first embodiment, a microscopic vision image is obtained by removing the optical element which causes a displacement of an optical axis from the optical path to obtain a standard ideal optical axis. However, removing all optical elements from the optical path to obtain the ideal optical axis requires a laborious operation of an observer.

Therefore, an observer processes an optical axis which passes a predetermined optical element as the ideal optical axis 11 for correcting the displacement of an optical axis. Herewith, the relative displacement of a specified optical axis with those of other optical elements can be removed. According to the present embodiment, the process contents are described below by referring to the flowchart shown in FIG. 13, and FIGS. 10 and 9.

According to the present embodiment, the distance d is obtained from the crossing position in the enlargement range 14 shown in FIG. 9. To first obtain an ideal optical axis, the parallel planar optical element 6a to be inserted when set as an ideal optical axis is inserted into an optical path (S300), a basic chart in which the optical axis 11 matches the crossing position is arranged on the stage 4 (S301). Then, by pressing a predetermined switch of the operation unit 10c (operation switch 10c), the capture designation information is transmitted to the arithmetic unit 10b. Upon receipt of the capture designation information, the arithmetic unit 10b controls the CCD controller 9 to capture an image using the CCD 8a (S302, refer to FIG. 10A).

As shown in FIG. 10A, the coordinates of the crossing position 11a indicating the center position of the image captured by the CCD 8a are obtained and stored in the storage unit 10a (S303). Then, the position of the basic chart is maintained as is, and the parallel planar optical element 6a is rearranged on the optical path (S304). Then, by pressing a predetermined switch of the operation unit 10c (operation switch 10c), the capture designation information is transmitted to the arithmetic unit 10b. Upon receipt of the capture designation information, the arithmetic unit 10b controls the CCD controller 9 to capture an image using the CCD 8a (S305, refer to FIG. 10B). In S302 and S305, the trigger of capturing an image is not limited to the above-mentioned operation unit (operation switch). For example, the panel displayed on the display unit 10d can be clicked by the mouse, etc. for a capturing operation. Also, for example, the function of a touch panel can be used on the display unit 10d to capture an image by touching the displayed panel.

Figure 10B:
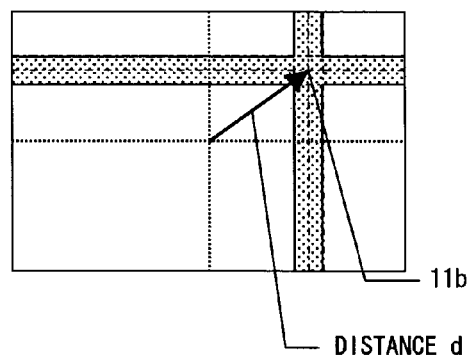

As shown in FIG. 10B, the coordinates of the crossing position indicating the center position of the image captured by the CCD 8a is obtained, and the coordinates are stored in the storage unit 10a (S306). In the present embodiment, the coordinates are obtained by operating the operation unit 10c from the image displayed on the display unit 10d, and stored in the storage unit 10a through the arithmetic unit 10b. Generally, the mouse provided for a computer can click on an image, or an image recognizing process is performed to automatically obtain the coordinates. Furthermore, the information that the parallel planar optical element 6a has been inserted into the optical path in S304 can be automatically recognized using a sensor, etc., thereby allowing the arithmetic unit 10b to control the CCD controller 9 to capture an image using the CCD 8a.

Assume that the coordinates obtained in S303 and S306 are 11a (Xa, Ya) and 11b (Xb, Yb) respectively. Using the obtained coordinates, the arithmetic unit 10b calculates the amount of displacement of the coordinates 11b (Xb, Yb) from the coordinates 11a (Xa, Ya) (S307). Then, using the stage conversion table stored in advance in the storage unit 10a, the amount of movement correction of the stage in the capture unit 8 is calculated from the amount of displacement (S308). The calculated amount of movement correction is converted into a voltage value for drive of the θ stage and the XY stage, and the voltage value is stored in the storage unit 10a (S309).

Thus, the load of the operation of the observer can be less than in the first embodiment by setting the optical axis of a predetermined optical element as a point of reference. The above-mentioned invention can be applied to all optical elements such as an object lens, etc. which generates a displacement of an optical axis in an optical element switch unit in the microscope system, furthermore, the amount of displacement can be obtained with a plurality of optical elements inserted into the optical path. Additionally, the amount of movement correction can be manually obtained. With the configuration in the capture unit realized by a combination of the stages (XY stage 8c, θ stage 8b, and Z stage 8d) loaded with the CCD 8a, the amount of displacement can be corrected in any direction of the microscopic vision image.

Fourth Embodiment

In the first embodiment, if the amount of displacement is obtained when a displacement of an optical axis is corrected, for example, a sample with which a correct position can be measured although the environment changes as shown by the basic chart in FIG. 9 has been used. However, obtaining the amount of displacement using other samples than the above-mentioned observation target requires a laborious operation of an observer. Therefore, the displacement of an optical axis is corrected using a microscopic vision image to be actually observed.

That is, an image of a parallel planar optical element is stored as a standard image, and an image of another parallel planar optical element is compared with the standard image to correct the amount of displacement.

Fifth Embodiment

When the displacement of an optical axis is very small, it is difficult to obtain the correct amount of displacement. Therefore, a microscopic vision image is enlarged and captured by the capture unit 8 by providing a unit for optically enlarging an image between the object lens and the capture surface. Then, a unit 20 capable of switching an image forming lens is attached as an enlargement unit to solve the problem of a small displacement of an optical axis in the following method.

EXAMPLE 1

In the present embodiment, a unit for switching an image forming lens as an enlargement unit is included.

Figure 14:
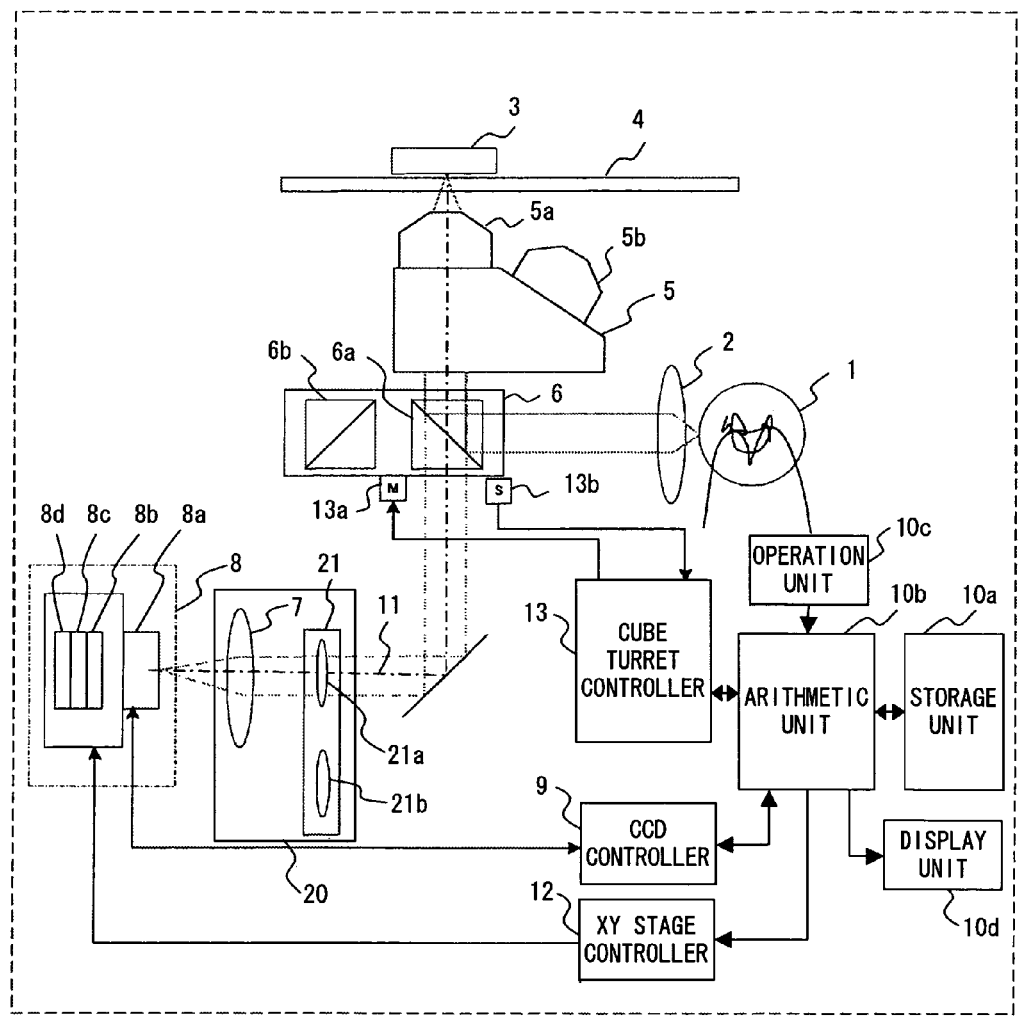
FIG. 14 shows an inverted image microscope system according to the first example of the fifth embodiment of the present invention.

FIG. 14 shows the inverted image microscope system according to the present embodiment. As shown in FIG. 14, the enlargement unit 20 is configured by the image forming lens 7 and an intermediate scaling unit 21. The intermediate scaling unit 21 switches the lenses to change the magnification between the image forming lens 7 and the object lens 5×. The intermediate scaling unit 21 is provided with two lenses 21a and 21b having different magnifications. Depending on the displacement width of an optical axis, the lenses 21a and 21b are switched to enlarge a small displacement of an optical axis, thereby easily detecting the displacement of an optical axis.

The magnification can also be changed by attaching a TV adapter, not shown in the attached drawings, between the CCD 8a and the image forming lens 7.

EXAMPLE 2

Figure 15:
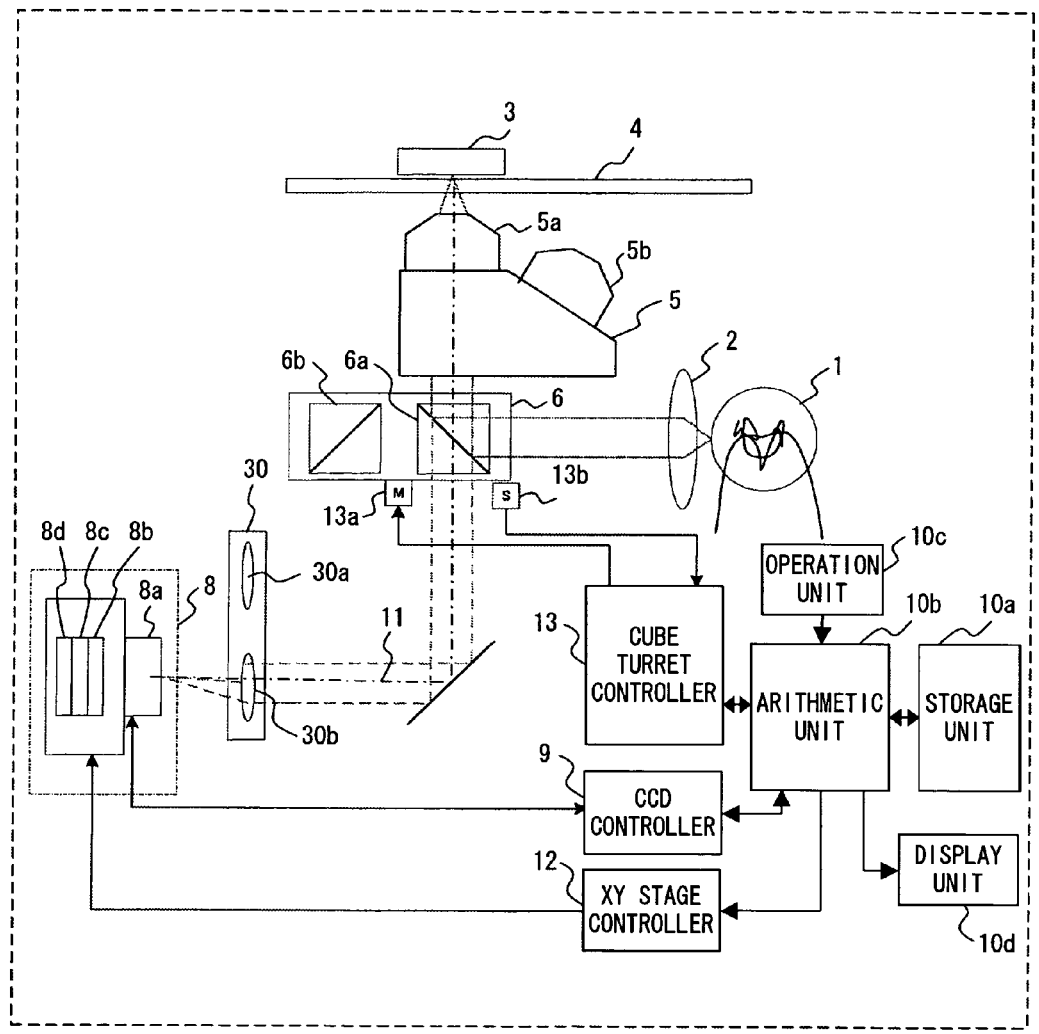
FIG. 15 shows an inverted image microscope system according to the second example of the fifth embodiment of the present invention.

FIG. 15 shows the inverted image microscope system according to the present embodiment. As shown in FIG. 15, an enlargement unit 30 is provided with image forming lenses 30a and 30b. Thus, the image forming lenses 30a and 30b having different focal lengths can be mutually exchanged depending on the rotation of a turret or the slide member. In this case, there is no problem when the displacement of an optical axis is very small, but when there occurs a displacement of the same level as the optical element unit 6, the above-mentioned correcting procedure can be applied to the process of switching image forming lenses.

EXAMPLE 3

Figure 16:
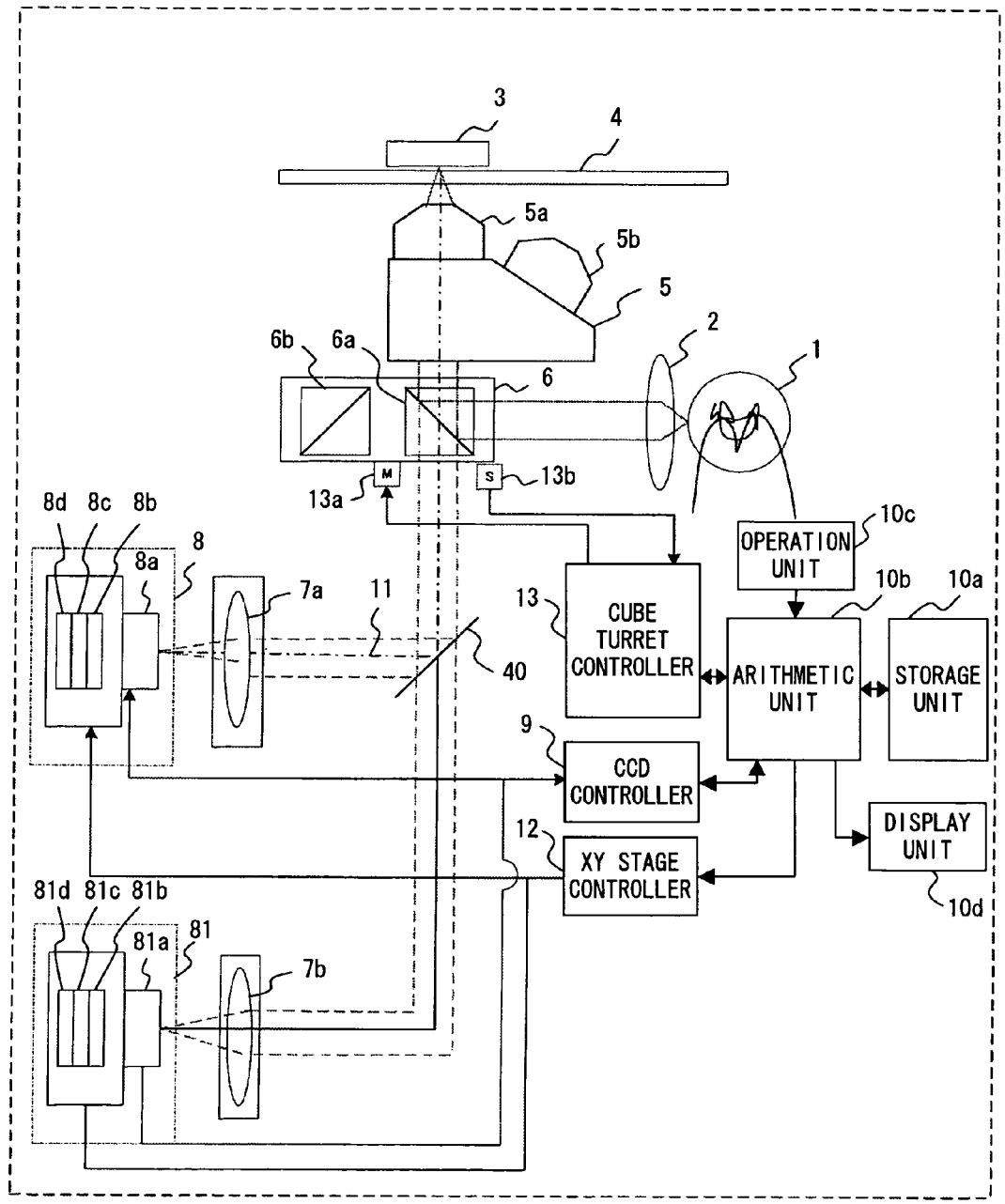
FIG. 16 shows an inverted image microscope system according to the third example of the fifth embodiment of the present invention.

FIG. 16 shows the inverted image microscope system according to the present embodiment. As shown in FIG. 16, an optical path is split by a half mirror 40, and the purpose can be attained by the configuration of obtaining images having different image forming magnifications using image forming units 8 and 81 (the image forming unit 81 and the image forming unit 8 have the same configurations) having the same structures as image forming lenses 7a and 7b of different focal lengths. At this time, the effect of the half mirror 40 realizes a capturing process by the image forming unit 8 or 81.

Instead of the half mirror 40, a beam splitter can be used to split the light and allow the light to be input to the image forming units 8 and 81 respectively. Using the beam splitter, for example, depending on the deflection surface of light or the wavelength, the light can be split. Therefore, an image depending on the feature of each of the split light can be captured by each image forming unit.

EXAMPLE 4

In the example 1, the detection sensitivity of the displacement of an optical axis can be improved using an enlargement unit, but the image forming lens 7 can be used as a zoom lens instead of the enlargement unit.

The processes explained by referring to the first through fifth embodiments can be realized as a program to be executed by a computer.

Figure 17:
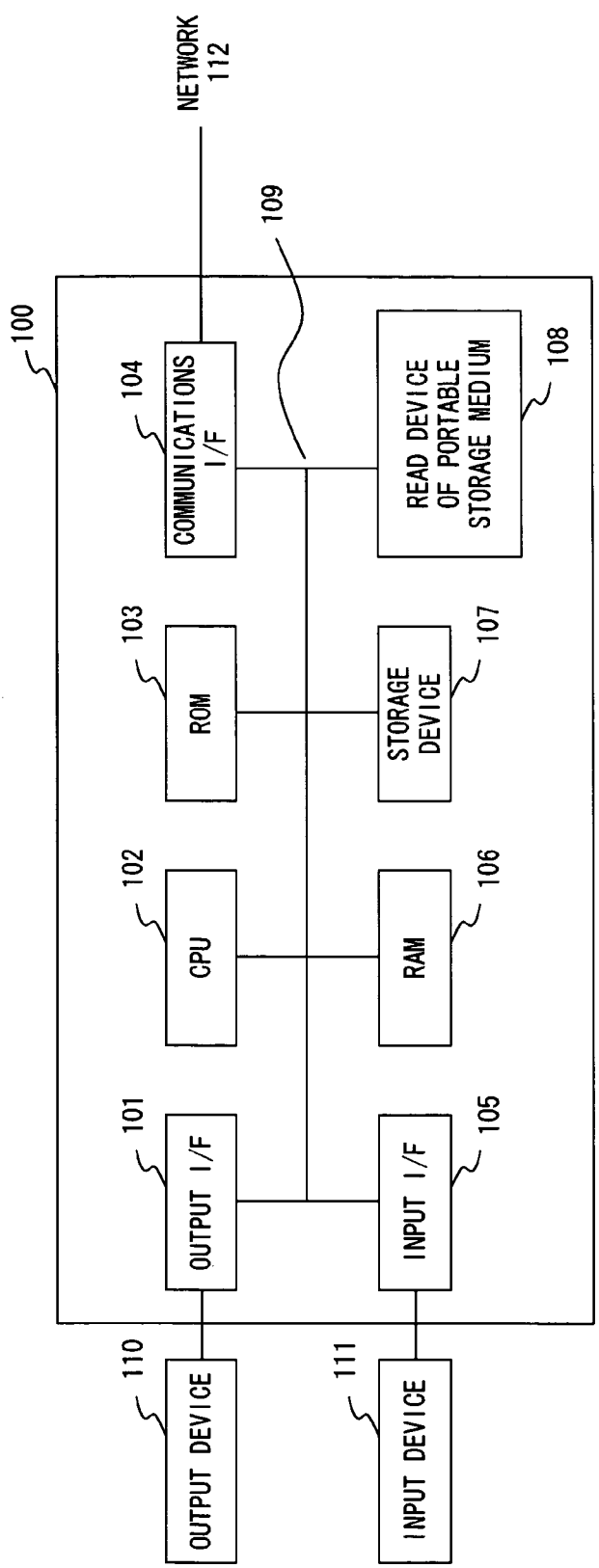
FIG. 17 shows the configuration of the hardware of a computer according to an embodiment of the present invention.

FIG. 17 is a block diagram showing the configuration of the above-mentioned computer system, that is, the hardware environment. In FIG. 17, a computer system 100 is configured by a central processing unit (CPU) 102, read only memory (ROM) 103, random access memory (RAM) 106, a communications interface (an interface is hereinafter referred to as an I/F) 104, a storage device 107, an output I/F 101, an input I/F 105, a read device 108 of a portable storage medium, a bus 109 through which all of these components are connected, an output device 110 connected to the output I/F 101, and an input device 111 connected to the input I/F 105.

The storage device 107 can be various types of storage devices such as a hard disk, a magnetic disk, etc., and the storage device 107 or the ROM 103 stores a program for the processes described above in the above-mentioned embodiments, and the program is read and executed by the CPU 102.

The above-mentioned program can be stored in, for example, the storage device 107 through a network 112 and a communications I/F 104, or stored in a marketed and distributed portable storage medium, set in the read device 108, and executed by the CPU 102. The portable storage medium can be any of various types of storage media such as CD-ROM, a flexible disk, an optical disk, a magneto-optical disk, an IC card, etc. The program stored in such a storage medium is read by the read device 108.

The input device 111 can be a capture unit according to each of the above-mentioned embodiments, and a digital camera, a digital video camera, etc. can be used. A mouse, a keyboard, etc. can also be included. The output device 110 can be a display, a printer, etc.

The network 112 can be a communications network such as the Internet, a LAN, a WAN, a dedicated line, a cable network, a wireless network, etc.

When the present invention is a program, it is designed as follows.

The first optical axis correction program of allowing the computer to perform the process of correcting the optical axis of the optical microscope system according to the present invention provided with a removable optical element for obtaining an image by the capture unit comprises:

a detecting process of detecting first location information indicating the location of a predetermined point in the image captured through the optical element and second location information indicating the location of a point corresponding to the predetermined point in the image captured without the optical element;

a calculating process of calculating the relative amount of displacement between the first location information and the second location information detected in the detecting process; and a movement control process of moving the capture unit based on the amount of the displacement calculated in the calculating process.

The second optical axis correction program of allowing the computer to perform the process of correcting the optical axis of the optical microscope system according to the present invention provided with a plurality of optical elements for obtaining an image by the capture unit comprises:

a switching process of switching the first optical element on the optical path in the plurality of optical elements into the second optical element;

a detecting process of detecting the first location information indicating the location of a predetermined point in the image captured through the first optical element and the second location information indicating the location of a point corresponding to the predetermined point in the image captured through the second optical element;

a calculating process of calculating the relative amount of displacement between the first location information and the second location information detected in the detecting process; and a movement control process of moving the capture unit based on the amount of the displacement calculated in the calculating process.

In the first or second optical axis correction program, the movement control process moves the capture unit in the direction perpendicular to the optical path of the light input to the capture unit.

In the first or second optical axis correction program, the movement control process moves the capture unit in the optical path direction of the light input to the capture unit.

In the first or second optical axis correction program, the movement control process rotates the capture unit in the direction perpendicular to the optical path of the light input to the capture unit.

The above-mentioned first or second optical axis correction program further comprises a magnification change process of changing a magnification of an image obtained by the capture unit.

As described above, according to the above-mentioned invention, the displacement of an optical axis caused by a hardware condition, an environmental change, etc. can be corrected by changing the capturing position. Since the displacement of an optical axis can be corrected on the capturing side, the object can be captured in a still status although it is in a liquid. Furthermore, although the displacement of an optical axis is very small, an image can be enlarged and the displacement of an optical axis can be corrected with high precision.

What is claimed is:

1. An optical microscope system, comprising:
   an object lens which collects light from a sample;
   a capture unit which obtains an image of the sample by capturing light from the object lens via an imaging lens;
   a removable optical element provided in an infinity correction optical system between the object lens and the imaging lens;
   a detection unit which detects first location information indicating a location of a predetermined point in the image captured by the capture unit through the optical element, and second location information indicating a location of a point corresponding to the predetermined point in an image captured without the optical element;
   a calculation unit which calculates a relative amount of displacement between the location indicated by the first location information and the location indicated by the second location information detected by the detection unit; and
   a movement control unit which moves the capture unit at least in a direction substantially perpendicular to an optical path of light input to the capture unit, so as to match the location indicated by the first location information with the location indicated by the second location information based on the amount of the displacement calculated by the calculation unit.

2. The optical microscope system according to claim 1, further comprising:
   an additional optical element; and
   a switch unit which switches the additional optical element into a position of the removable optical element;
   wherein the second location information, which is detected in the image captured without the removable optical element, indicates a location of a point corresponding to the predetermined point in the image captured through the additional optical element.

3. The optical microscope system according to claim 2, wherein the movement control unit moves the capture unit in an optical path direction of the light input to the capture unit.

4. The optical microscope system according to claim 2, wherein the movement control unit rotates the capture unit in a direction perpendicular to an optical path of the light input to the capture unit.

5. The optical microscope system according to claim 2, further comprising a magnification change unit which changes a magnification of the image obtained by the capture unit.

6. The optical microscope system according to claim 1, further comprising a magnification change unit which changes a magnification of the image obtained by the capture unit.

7. The optical microscope system according to claim 1, wherein the optical element comprises a parallel planar optical element.

8. The optical microscope system according to claim 1, wherein the capture unit comprises a stage, and the movement control unit moves the stage.

9. The optical microscope system according to claim 8, wherein the movement control unit moves the capture unit in an optical path direction of the light input to the capture unit.

10. The optical microscope system according to claim 8, wherein the movement control unit rotates the capture unit in a direction perpendicular to an optical path of the light input to the capture unit.

11. An optical axis correcting method for correcting an optical axis of an optical microscope system including an object lens which collects light from a sample, a capture unit which obtains an image of the sample by capturing light from the object lens via an imaging lens, and a removable optical element provided in an infinity correction optical system between the object lens and the imaging lens, said method comprising:
    detecting first location information indicating a location of a predetermined point in the image captured by the capture unit through the optical element, and second location information indicating a location of a point corresponding to the predetermined point in an image captured without the optical element;

calculating a relative amount of displacement between the location indicated by the detected first location information and the location indicated by the detected second location information; and moving the capture unit at least in a direction substantially perpendicular to an optical oath of light input to the capture unit, so as to match the location indicated by the first location information with the location indicated by the second location information based on the calculated amount of the displacement.

12. The method according to claim 11, wherein the optical microscope system further comprises an additional optical element, and the method further comprises:

switching the additional optical element into a position of the removable optical element;

wherein the second location information, which is detected in the image captured without the removable optical element, indicates a location of a point corresponding to the predetermined point in the an image captured through the additional optical element.

13. The method according to claim 12, wherein when the capture unit is moved, the capture unit is moved in an optical path direction of the light input to the capture unit.

14. The method according to claim 12, wherein when the capture unit is moved, the capture unit is rotated in a direction perpendicular to an optical path of the light input to the capture unit.

15. The method according to claim 12, further comprising changing a magnification of the image obtained by the capture unit.

16. The method according to claim 11, further comprising changing a magnification of the image obtained by the capture unit.

17. The method according to claim 11, wherein the optical element comprises a parallel planar optical element.

18. The method according to claim 11, wherein the capture unit comprises a stage, and the capture unit is moved by moving the stage.

19. The method according to claim 18, wherein when the capture unit is moved, the capture unit is moved in an optical path direction of the light input to the capture unit.

20. The method according to claim 18, wherein when the capture unit is moved, the capture unit is rotated in a direction perpendicular to an optical path of the light input to the capture unit.

21. A computer readable storage medium storing an optical axis correction program used to direct a computer to perform a process of correcting an optical axis of an optical microscope system including an object lens which collects light from a sample, a capture unit which obtains an image of the sample by capturing light from the object lens via an imaging lens, and a removable optical element provided in an infinity correction optical system between the object lens and the imaging lens, said program being executable by the computer to cause the computer to perform processes comprising:

a detecting process of detecting first location information indicating a location of a predetermined point in the image captured by the capture unit through the optical element, and second location information indicating a location of a point corresponding to the predetermined point in an image captured without the optical element;

a calculating process of calculating a relative amount of displacement between the location indicated by the first location information and the location indicated by the second location information detected in the detecting process; and a movement control process of moving the capture unit at least in a direction substantially perpendicular to an optical path of light input to the capture unit, so as to match the location indicated by the first location information with the location indicated by the second location information based on the amount of the displacement calculated in the calculating process.

22. The storage medium according to claim 21, wherein the optical microscope system further comprises an additional optical element, and the processes performed by the computer further comprise:

a switching process of switching the additional optical element into a position of the removable optical element;

wherein the second location information, which is detected in the image captured without the removable optical element, indicates a location of a point corresponding to the predetermined point in an image captured through the additional optical element.

23. The storage medium according to claim 22, wherein the movement control process moves the capture unit in an optical path direction of the light input to the capture unit.

24. The storage medium according to claim 22, wherein the movement control process rotates the capture unit in a direction perpendicular to an optical path of the light input to the capture unit.

25. The storage medium according to claim 22, wherein the processes performed by the computer further comprise a magnification change process of changing a magnification of the image obtained by the capture unit.

26. The storage medium according to claim 21, wherein the processes performed by the computer further comprise a magnification change process of changing a magnification of the image obtained by the capture unit.

27. The storage medium according to claim 21, wherein the optical element comprises a parallel planar optical element.

28. The storage medium according to claim 21, wherein the capture unit comprises a stage, and the movement control process moves the stage.

29. The storage medium according to claim 28, wherein the movement control process moves the capture unit in an optical path direction of the light input to the capture unit.

30. The storage medium according to claim 28, wherein the movement control process rotates the capture unit in a direction perpendicular to an optical path of the light input to the capture unit.

31. A computer data signal embodied in a carrier wave for correcting an optical axis of an optical microscope system including an object lens which collects light from a sample, a capture unit which obtains an image of the sample by capturing light from the object lens via an imaging lens, and a removable optical element provided in a infinity correction optical system between the object lens and the imaging lens, said data signal being used to direct a computer to perform processes comprising:

a detecting process of detecting first location information indicating a location of a predetermined point in the image captured by the capture unit through the optical element, and second location information indicating a location of a point corresponding to the predetermined point in an image captured without the optical element;

a calculating process of calculating a relative amount of displacement between the location indicated by the first location information and the location indicated by the second location information detected in the detecting process; and a movement control process of moving the capture unit at least in a direction substantially perpendicular to an optical oath of light input to the capture unit, so as to match the location indicated by the first location information with the location indicated by the second location information based on the amount of the displacement calculated in the calculating process.

32. The signal according to claim 31, wherein the optical microscope system comprises an additional optical element, and wherein the processes performed by the computer further comprise:

a switching process of switching the additional optical element into a position of the removable optical element;

wherein the second location information which is detected in the image captured without the removable optical element, indicates a location of a point corresponding to the predetermined point in an image captured through the additional optical element.

33. The signal according to claim 32, wherein the movement control process moves the capture unit in an optical path direction of the light input to the capture unit.

34. The signal according to claim 32, wherein the movement control process rotates the capture unit in a direction perpendicular to an optical path of the light input to the capture unit.

35. The signal according to claim 32, wherein the processes performed by the computer further comprise a magnification change process of changing a magnification of an image obtained by the capture unit.

36. The signal according to claim 31, wherein the processes performed by the computer further comprise a magnification change process of changing a magnification of an image obtained by the capture unit.

37. The signal according to claim 31, wherein the optical element comprises a parallel planar optical element.

38. The signal according to claim 31, wherein the capture unit comprises a stage, and the movement control process moves the stage.

39. The signal according to claim 38, wherein the movement control process moves the capture unit in an optical path direction of the light input to the capture unit.

40. The signal according to claim 38, wherein the movement control process rotates the capture unit in a direction perpendicular to an optical path of the light input to the capture unit.

41. An optical microscope system, comprising:

an object lens which collects light from a sample;

capture means for obtaining an image of the sample by capturing light from the object lens via an imagine lens;

a removable optical element provided in an infinity correction optical system between the object lens and the imaging lens;

detection means for detecting first location information indicating a location of a predetermined point in the image captured by the capture means through the optical element, and second location information indicating a location of a point corresponding to the predetermined point in an image captured without the optical element;

calculating means for calculating a relative amount: of displacement between the location indicated by the first location information and the location indicated by the second location information detected by the detection means; and movement control means for moving the capture means at least in a direction substantially perpendicular to an optical path of light input to the capture means, so as to match the location indicated by the first location information with the location indicated by the second location information based on the amount of the displacement calculated by the calculation means.

42. The optical microscope system according to claim 41, further comprising:

an additional optical element; and switch means for switching the additional optical element into a position of the removable optical element;

wherein the second location information, which is detected in an image captured without the removable optical element, indicates a location of a point corresponding to the predetermined point in the image captured through the second optical element.

* * * * *